US008138974B2

(12) United States Patent
Hido et al.

(10) Patent No.: US 8,138,974 B2
(45) Date of Patent: Mar. 20, 2012

(54) LOCATION ESTIMATION SYSTEM, METHOD AND PROGRAM

(75) Inventors: Shohei Hido, Yokohama (JP); Tsuyoshi Ide, Kawasaki (JP); Hisashi Kashima, Yokohama (JP); Shoko Suzuki, Kawasaki (JP); Akira Tajima, Tokyo-to (JP); Rikiya Takahashi, Yokohama (JP); Toshihiro Takahashi, Yamato (JP); Yuta Tsuboi, Yamato (JP)

(73) Assignee: International Busines Machines Corporation, Armonk, NY (US)

( * ) Notice: Subject to any disclaimer, the term of this patent is extended or adjusted under 35 U.S.C. 154(b) by 629 days.

(21) Appl. No.: 12/257,437

(22) Filed: Oct. 24, 2008

(65) Prior Publication Data

US 2009/0109095 A1 Apr. 30, 2009

(30) Foreign Application Priority Data

Oct. 25, 2007 (JP) ................. 2007-277207

(51) Int. Cl.
*G01S 5/02* (2010.01)
*G01S 3/02* (2006.01)
(52) U.S. Cl. ...................... 342/417; 342/451
(58) Field of Classification Search ............ 342/451, 342/417
See application file for complete search history.

(56) References Cited

U.S. PATENT DOCUMENTS

| | | | | |
|---|---|---|---|---|
| 7,020,475 | B2 * | 3/2006 | Bahl et al. | 455/456.1 |
| 7,099,676 | B2 * | 8/2006 | Law et al. | 455/456.6 |
| 7,274,332 | B1 * | 9/2007 | Dupray | 342/450 |
| 7,339,523 | B2 * | 3/2008 | Bye | 342/451 |
| 7,769,396 | B2 * | 8/2010 | Alizadeh-Shabdiz et al. | 455/456.6 |
| 2006/0119516 | A1 * | 6/2006 | Krumm et al. | 342/451 |
| 2007/0139269 | A1 * | 6/2007 | Chen et al. | 342/450 |
| 2008/0039114 | A1 * | 2/2008 | Phatak et al. | 455/456.1 |

FOREIGN PATENT DOCUMENTS

JP PUPA 2005-274363 10/2005

OTHER PUBLICATIONS

Nashine, Hemant Kumar, "Coincidence Points and Invariant Approximation Results on q-Normed Spaces", Faculty of Sciences and Mathematics, University of Nis, Serbia, Aug. 19, 2006.*
Zhu et al, Semi Supervised Learning Using Guassian Fields and Harmonic Functions, Proceedings of the Twentieth Int'l Conf on Machine Learning (ICML-2003), Washington DC 2003.

* cited by examiner

*Primary Examiner* — Thomas Tarcza
*Assistant Examiner* — Frank McGue
(74) *Attorney, Agent, or Firm* — Vazken Alexanian

(57) ABSTRACT

A location estimation method using label propagation. The achieved location estimation method is robust to variations in radio signal strengths and is highly accurate by using the q-norm ($0<q<1$), especially, for calculating the similarities among radio signal strength vectors. The accuracy in location estimation is further improved by putting more importance on the time-series similarities. Specifically, the time-series similarity is calculated by using time-series values indicating the temporal order of radio signal strengths during the measurement. If the time-series similarity is larger than the similarity between the radio signal strength vectors, the time-series similarity is preferentially used. The exponential attenuation function can also be used for calculating the similarities, instead of the q norm ($0<q<1$).

27 Claims, 6 Drawing Sheets

CONTENT OF MEASURED RADIO SIGNAL DATA X
(DATA WITH TIME-SERIES INFORMATION)

| DATA ID | TRACE ID (TID) | TIME ID (t) | LOCAITON LABEL (LocationID) | RADIO SIGNAL STRENGTH RSS VALUES FROM ACCESS POINTS (-100~0) | | | | | |
|---|---|---|---|---|---|---|---|---|---|
| | | | | AID1 | AID2 | AID3 | AID4 | AID5 | ... |
| x_101 | 1 | 1 | 6 | -58 | -88 | -100 | -100 | -80 | ... |
| x_102 | 1 | 2 | ? | -58 | -95 | -100 | -100 | -100 | ... |
| x_103 | 1 | 3 | ? | -65 | -95 | -100 | -100 | -75 | ... |
| x_104 | 2 | 1 | 23 | -62 | -83 | -59 | -90 | -93 | ... |
| x_105 | 2 | 2 | ? | -62 | -83 | -59 | -90 | -100 | ... |
| x_106 | 2 | 3 | 9 | -67 | -83 | -59 | -84 | -100 | ... |
| ⋮ | ⋮ | ⋮ | ⋮ | ⋮ | ⋮ | ⋮ | ⋮ | ⋮ | |

FIG. 4

**CONTENT OF MEASURED RADIO SIGNAL DATA X
(DATA WITHOUT TIME-SERIES INFORMATION)**

|  | TRACE ID | TIME ID | LOCAITON LABEL | RADIO SIGNAL STRENGTH RSS VALUES INDICATING ELEMENTS OF VECTOR x (-100~0) | | | | | |
|---|---|---|---|---|---|---|---|---|---|
| DATA ID | TID | t | LocationID | AID1 | AID2 | AID3 | AID4 | AID5 | ... |
| x_1 | None | None | 4 | -93 | -100 | -78 | -81 | -90 | ... |
| x_2 | None | None | ? | -100 | -100 | -100 | -58 | -63 | ... |
| x_3 | None | None | 6 | -92 | -100 | -100 | -100 | -100 | ... |
| x_4 | None | None | 94 | -100 | -78 | -79 | -87 | -100 | ... |
| x_5 | None | None | ? | -85 | -82 | -100 | -100 | -100 | ... |
| x_6 | None | None | ? | -72 | -100 | -100 | -94 | -100 | ... |
| ⋮ | ⋮ | ⋮ | ⋮ | ⋮ | ⋮ | ⋮ | ⋮ | ⋮ | |

LOCATION ESTIMATION SYSTEM, METHOD AND PROGRAM

CROSS REFERENCE TO RELATED APPLICATION

This application claims priority under 35 U.S.C. §119 from Japanese Patent Application No. 2007277207 filed Oct. 25, 2007, the entire contents of which are incorporated herein by reference.

BACKGROUND OF THE INVENTION

1. Field of the Invention

The present invention relates to a system, a method, and a program for detecting a location by receiving radio signals from multiple radio signal generation sources. More specifically, the present invention relates to a system, a method and a program for estimating location data, of a given place, associated with radio strengths, on the basis of known location data associated with radio strengths recorded in advance.

2. Description of Related Art

There has heretofore been a demand to track, in a room, movement of an object provided with a radio signal receiver. For example, a technique called trace analysis has been carried out in a supermarket by tracking movement of a special information terminal attached to a shopping cart to investigate relationships between products on shelves and products customers buy. Thereby, placement of products can be optimized in the store.

To carry out a trace analysis, radio signal generation sources are provided at different places in the store. While a customer moves around in the store while pushing the shopping cart, the information terminal receives radio signals from the respective radio signal generation sources at different time points. With the information on such time difference, the location of the shopping cart can be determined by means of a method called triangulation. However, simple application of the triangulation method often leads to extreme deterioration in the accuracy of the location measurement. Such deterioration is likely to occur especially in the case of a location measurement in an indoor environment containing a large number of reflectors and obstacles. This is because such a large number of reflectors and obstacles cause reflected waves to interfere with each other in some cases, or, block all the direct paths between a radio signal receiver and radio signal generation sources, thereby causing the radio signal receiver to receive only reflected waves.

In view of the above problem, Japanese Patent Application Laid-open Publication No. 2005-274363 discloses a technique for obtaining the most-probable location of a mobile object in the following manner. Specifically, the deviations of radio location detection means are measured in advance at predetermined locations by means of a method employing triangulation. Thereafter, by interpolating this measured deviation information, the deviations of the radio location detection means at general locations are estimated. Then, in an actual measurement, a radio detection location is corrected by using the result of the estimation to obtain the most-probable location of the mobile object.

However, the calculation method used in triangulation is relatively simple, and hence, a location cannot be measured highly accurately with the method using triangulation even when various kinds of correction means are employed.

In the field of machine learning, a technique called label propagation method is known. A fundamental document disclosing this technique is "Semi-supervised learning using Gaussian fields and harmonic functions", Proceedings of the Twentieth International Conference on Machine Learning (ICML-2003), by Xiaojin Zhu, Zoubin Ghahramani, John Lafferty, Washington D.C., 2003 (hereinafter, referred to as Non-patent document 1).

Non-patent document 1 relates to a method for estimating a label for an unlabeled vertex in a weighted graph having labeled and unlabeled vertices, and proposes application examples of digit classification and text classification techniques. However, no satisfactory results were obtained by directly applying the disclosed method without modification, to estimate a location based on the strengths of radio signals received from multiple radio signal generation sources.

SUMMARY OF THE INVENTION

It is an object of the present invention to provide a method for improving the estimation accuracy of a system estimating a location on the basis of the strengths of radio signals received from multiple radio signal generation sources.

It is another object of the present invention to improve the estimation accuracy of a system estimating a location on the basis of neighborhood relationships, by improving an algorithm for similarities representing neighborhood relationships.

The above-described objects can be achieved through the following process according to the present invention.

Hereinafter, a vector having reception strengths (using received signal strengths (RSS) for its unit) respectively from multiple radio signal generation sources (access points) is referred to as an RSS vector. According to the invention, firstly, data sequences of such RSS vectors are prepared. The data sequences include those measured and arranged in chronological order, and those not necessarily arranged in chronological order. Each of the data sequences measured and arranged in chronological order includes a trace ID and a time ID. The trace ID is an ID given to data sequences of one measurement series. For example, one trace ID is given to a series of data measured between the start and the end of data measurement carried out by one person. The time ID can be, for example, an ordinal number of measuring data within one trace ID.

The data sequences include labeled data and unlabeled data. Labeled data is obtained by recording radio signal strengths as well as an actual location, that is, is learning data. Unlabeled data is, on the other hand, data in which no location is specified. An object of this disclosed method is to estimate, by using learning data, a probable location for data in which no location is specified.

Here, assume that the i-th RSS vector of the data sequences is $X^{(i)}$. A degree called affinity between $X^{(i)}$ and $X^{(j)}$ is calculated by using a function such as the heat kernel function. Note that, according to an aspect of the invention, the used function is different from the normal heat kernel function in that the index indicating the norm of the difference between vectors is smaller than 1. One of preferred values of such index is 0.5 in the invention.

On the other hand, the affinity for the data sequences measured and arranged in chronological order may be calculated in the same manner as that for the data sequences not arranged in chronological order. Instead, according to another aspect of the invention, the affinity between $X^{(i)}$ and $X^{(j)}$ can be calculated, by using the trace IDs and the time IDs given to the data sequences measured and arranged in chronological order, to take a predetermined positive value (1, for example) if i-th and j-th RSS vectors are recorded with the same trace ID but different time IDs having a difference of 1, or to take 0 if otherwise.

According to still another aspect of the invention, a comparison is made between the affinity values of (i,j) thus obtained from the data sequences measured and arranged in chronological order, and from the data sequences not arranged in chronological order. Then, the larger one of the affinity values is set to be the eventual affinity value of (i,j).

The plausibility score $f^{(i)}(c)$ that the i-th measurement value is obtained at a location c can be calculated by calculating the plausibility score $f^{(j)}(c)$ that the j-th measurement value is obtained at a location c, by using the eventual affinity value as the weight, where j=1 ... N (N is the number of datasets). The predicted location c is obtained by particularly choosing the location c having the highest plausibility score $f^{(i)}(c)$.

According to another aspect of the invention, the asymptotic exponential attenuation function is used in an affinity calculation. This can be more effective in some application examples.

BRIEF DESCRIPTION OF THE DRAWINGS

For a more complete understanding of the present invention and the advantage thereof, reference is now made to the following description taken in conjunction with the accompanying drawings.

FIG. 4 shows an example of measured radio signal datasets with time-series information.

FIG. 5 shows an example of measured radio signal datasets without time-series information.

DETAILED DESCRIPTION OF THE PREFERRED EMBODIMENT

Figure 1:
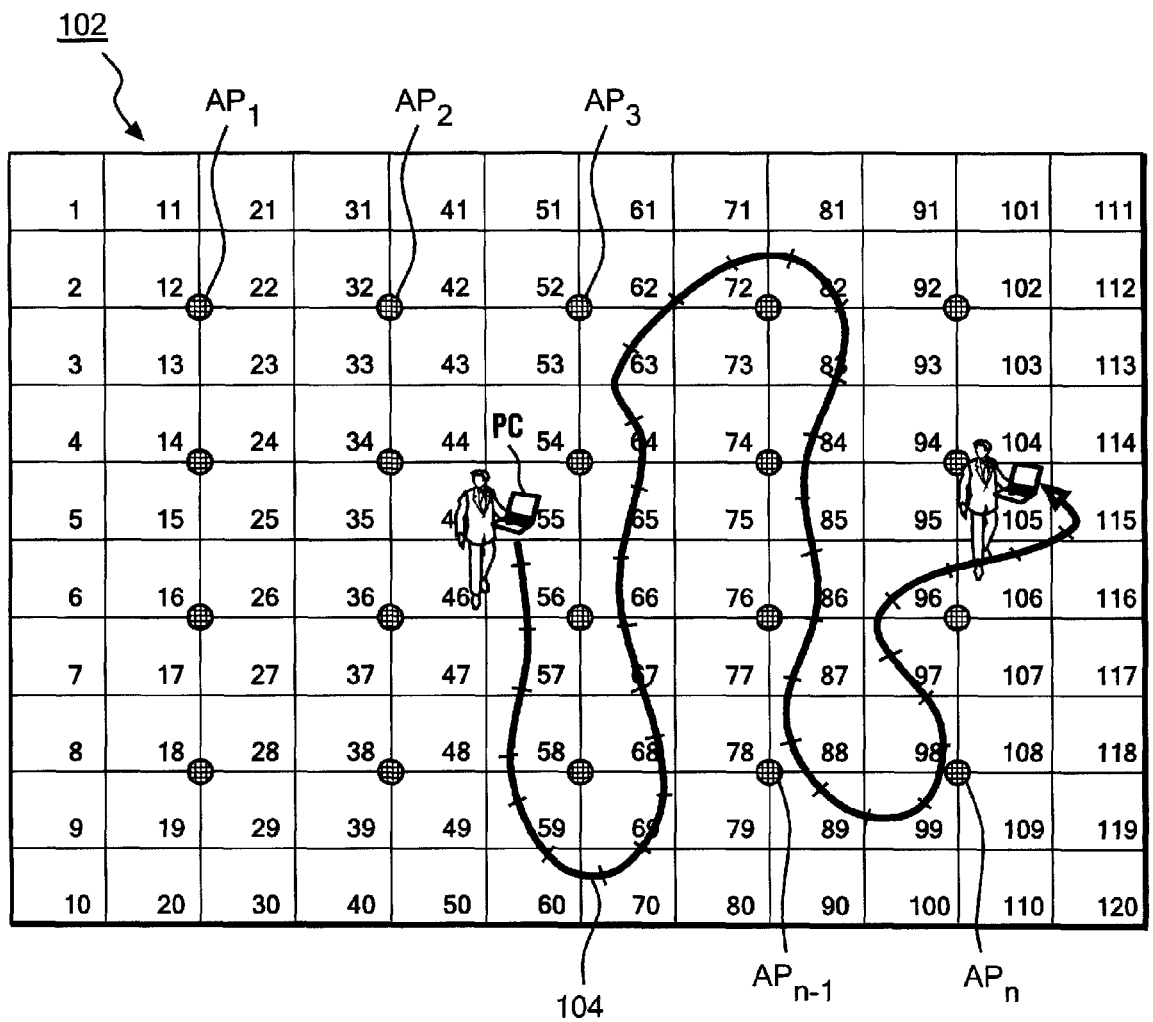
FIG. 1 illustrates location label assignment and arrangement of access points inside of a room.

Hereinbelow, an embodiment of the present invention will be described with reference to the drawings. For convenience of description, a case where the invention is applied to the label propagation method will be primarily described. However, it should be understood that the application field of the invention is not limited to the label propagation method. The invention is also applicable to a more general nearest neighbor decision method, or to an even more general method of estimating a location on the basis of neighborhood relationship. It should also be understood that the embodiment is given only for describing a best mode of the invention, and that the scope of the invention should not be limited to the description of the embodiment. In addition, unless otherwise stated, the same reference numerals indicate the same elements throughout the drawings.

FIG. 1 is an illustration showing a general outline of a location estimation system using multiple radio signal sources, which is a basic principle for this embodiment. As shown in FIG. 1, the inside of a room 102 is divided into 10 meshes×12 meshes, and the meshes are denoted by reference numerals 1 to 120, respectively. Here, the mesh dividing lines and the numbers shown in the area of FIG. 1 are imaginary ones, and hence, it is not necessary to actually draw lines and numbers on the floor or the like of the room 102.

In this embodiment, one mesh area is set to be 2 m×2 m rectangular. However, the area is divided into 10×12 meshes in FIG. 1 only for the purpose of schematic illustration, because the size of a mesh area, the number of meshes to be divided into, and the like vary in accordance with the purpose of location estimation, the size of the room, the number of wireless access points to be described later, and the like.

As shown in FIG. 1, the room 102 is also provided with multiple wireless access points $AP_1, AP_2, \ldots, AP_n$. The access points $AP_1, AP_2, \ldots, AP_n$ are, although not limited to, radio signal generation sources in conformity with WiFi (registered trademark) standard, for example. The access points can be provided to any places in the room 102 where a radio signal receiver is least likely to be inhibited from receiving radio waves. Such places can be, for example, on the surface of a wall, the ceiling, the floor, and a partition inside the room 102. The access points $AP_1, AP_2, \ldots, AP_n$ are connected to a server computer (not shown) for controlling the access points $AP_1, AP_2, \ldots, AP_n$.

According to the principle of triangulation, the minimum number of access points required for carrying out location measurement is 3. However, since the necessary accuracy cannot be obtained by using only 3 access points, the number of access points is generally chosen from numbers between 50 to 100 in accordance with the size of the room, the accuracy required for the location estimation and the like. The present invention can be, however, applied to a system including any number of access points, instead of the aforementioned number of access points.

A necessary operation in preparation of this embodiment is for an operator or a user to record the strengths of radio signals received from the multiple access points in different locations while moving around in the room 102 with a mobile computer PC having the radio signal receiving function. A trace, 104 shown in FIG. 1, is an example of a track of such movement.

Figure 2:
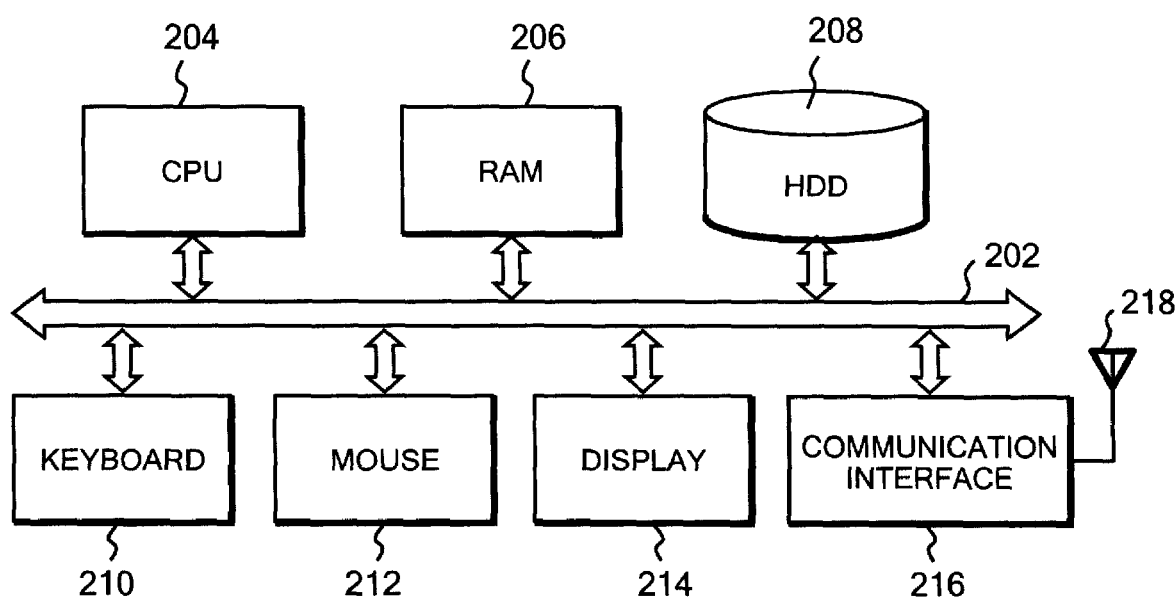
FIG. 2 shows hardware of a mobile computer for recording radio signal strengths.

FIG. 2 is a block diagram illustrating a hardware configuration of the mobile computer PC shown in FIG. 1. In FIG. 2, a central processing unit (CPU) 204, a main memory (random access memory (RAM)) 206, a hard disk drive (HDD) 208, a keyboard 210, a mouse 212 and a display 214 are connected to a system bus 202. A CPU having a 32-bit architecture is suitable to be used as the CPU 204, and examples of such CPU are a PENTIUM™ 4 processor and a CORE™ 2 Duo processor from Intel Corporation as well as an ATHLON™ processor from Advanced Micro Devices (AMD) Inc. A RAM with a memory capacity of 1 GB or more is suitable to be used as the main memory 206.

A communication interface 216 is also connected to the system bus 202. The communication interface 216 conforms to IEEE802.11a/b/g standard, and is capable of receiving, via an antenna 218, radio signals from the access points $AP_1, AP_2, \ldots, AP_n$ provided in the room 102.

In the HDD 208, an unillustrated operating system is stored. The operating system can be any operating system that is compatible with the CPU 204, for example: LINUX™; WINDOWS VISTA™, WINDOWS XP™ or WINDOWS™ 2000 from Microsoft Corporation; or MAC OS™ from Apple Inc.

The HDD 208 further stores: a program for recording the strength of radio signal received from each of the access points; and a location estimation program according to the invention.

The recording program enables recording the strengths of radio signals received from the individual access points on the HDD 208 at any time point by user operation, or automatically. The recording program can be used for recording both labeled (location-specified) and unlabeled data, and can also be used for automatic continuous recording.

Figure 3:
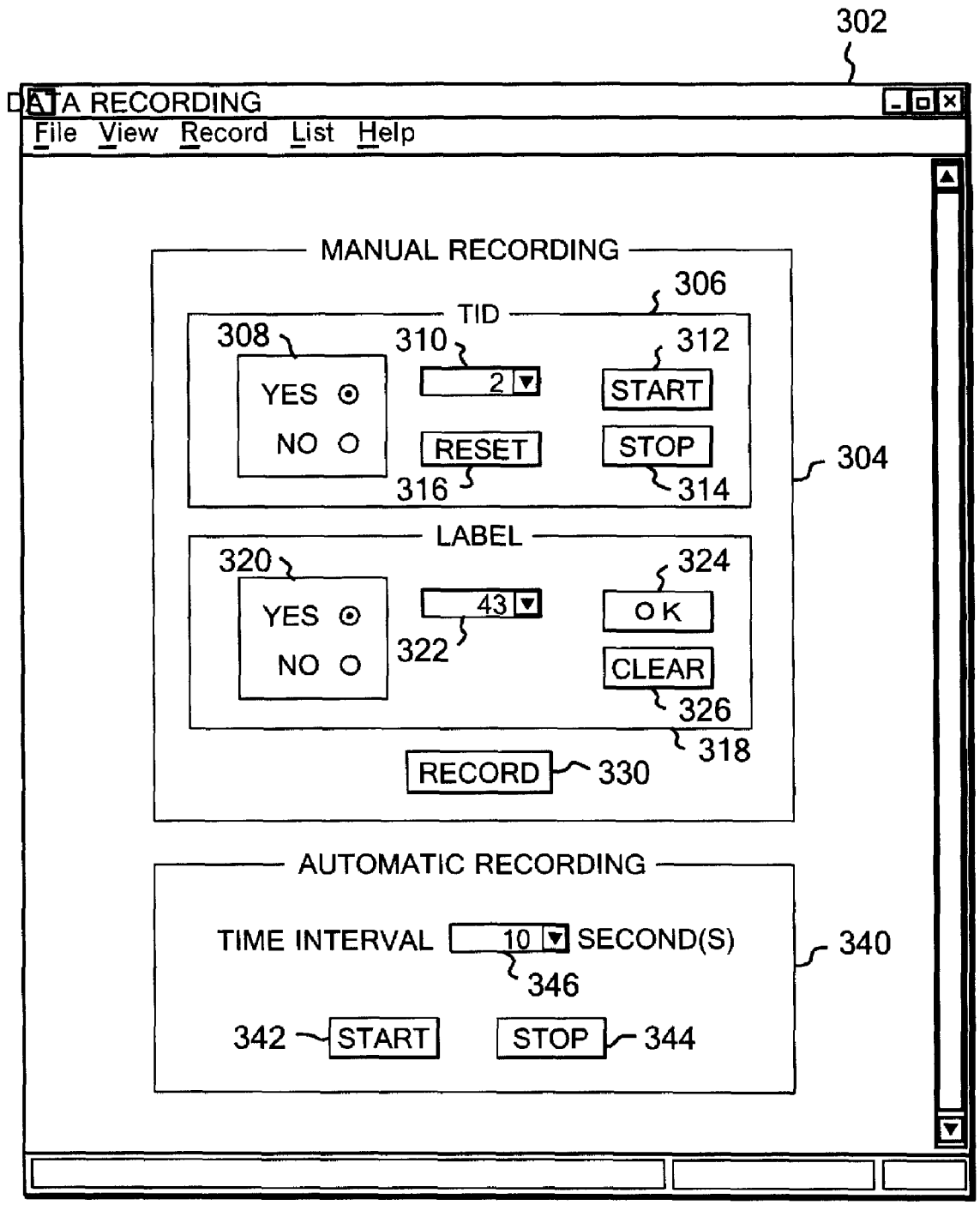
FIG. 3 shows a menu of a program for recording radio signal strengths by using the mobile computer.

FIG. 3 shows a screen 302 of the recording program to be displayed on a display 214 of the mobile computer PC. In response to a click on a predetermined icon shown in the desktop of the mobile computer PC by use of the mouse 212, the screen 302 is displayed on the screen by loading data from the HDD 208 into the main memory 206 by an operation of the operating system.

In FIG. 3, when "YES" of radio buttons 308 of a Trace ID (TID) menu 306 in a manual recording menu 304 is clicked, a TID value 310 is set to be used for recording. Then, by clicking button 312, the TID value 310 is incremented, so that a time ID is reset to 1. Here, the time ID is a value indicating an ordinal number of recording within the trace ID. By clicking the "record" button 330 in this state, measured radio signal data is recorded with the specified TID. Every time the recording is completed, the time ID is incremented by 1. By clicking button 314, the recording with the trace ID is terminated. Then, the chosen button of the radio button 308 is switched from "YES" to "NO". In the state where "NO" of radio button 308 is chosen, a "start" button 306 is set to "invalid". To start the recording with a trace ID again, the chosen button of the radio button 308 needs to be switched from "NO" to "YES". Since the TID value 310 is automatically incremented every time the "start" button 312 is clicked, no special operation is required in general to increment the TID value 310. However, the TID value 310 can be reset to 0 by clicking button 316 when needed.

In label menu 318, a value is inputted into a field 322 by switching the chosen button of radio button 320 to "YES". The inputted value is confirmed by clicking a button 324 to be set as location label data. Then, by clicking the "record" button, measured radio signal data is recorded with the location label data. Here, if a trace ID is set, the trace ID and the time ID are recorded together with the measured radio signal data. By switching the chosen button of the radio buttons 320 from "YES" to "NO", label data is set not to be included in the measured radio signal data. In the above, it was mentioned that the mesh dividing lines and the numbers shown in the area of FIG. 1 are imaginary ones. However, it is difficult for the operator to choose a corresponding location label without any marks when recording data including label information. Accordingly, it is desired that marks for showing the label numbers of the areas be put on the floor, or somewhere around the corresponding areas.

An automatic recording menu 340 is also shown in FIG. 3. In this case, automatic recording is started by clicking a "start" button 342. In this automatic recording, data is recorded at intervals of certain seconds equivalent to the value inputted to a field 346. The recording is terminated by clicking a "stop" button 344. In the automatic recording menu 340, neither TID nor location label data are used. This automatic recording menu 340 is used in the case of recording a large number of unlabeled data, or in the case of simulating recording in an actual measuring mode instead of a learning mode.

Although detailed illustration is omitted, the recording program shown in FIG. 3 also includes a function to import measured radio signal data from another personal digital assistant (PDA) or laptop computer, and to export measured radio signal data to another PDA or laptop computer, by use of the list menu of the menu bar. The data may be imported and exported through a connected network via a server or by using an external HDD connected to the mobile computer PC through a universal serial bus (USB) interface.

FIG. 4 shows an example of measured radio signal data recorded with the trace ID set. Data IDs shown in FIG. 4 are values automatically provided by the recording program shown in FIG. 3, and are unique values respectively for the data as long as the values are reset through the menu. In FIG. 4, each fraction of data having "?" in the location ID column is recorded under the condition where selection "NO" of the radio button 320 is chosen in the label menu 318 of FIG. 3.

Now, the radio signal strength RSS values shown in FIG. 4 will be explained. RSS stands for received signal strength, and is a unit of a logarithmic scale of radio signal strengths. An RSS value takes 0 at a maximum and −100 at a minimum. If the RSS value is −100, this indicates that no radio signal is substantially received. Here, as the unit of radio signal strengths, other units, such as dBμV/m, can be used instead of RSS. However, it is preferable that logarithmic strength be used.

FIG. 5, by contrast, shows an example of measured radio signal data recorded in the case where the trace ID is not set. In this case, since no data on trace ID and time ID are recorded, the data includes no time-series information. In other words, the data simply include only location label information, recorded if a location label is set, and the vector of radio signal strength RSS values corresponding to the location label information. It should be noted that although FIGS. 4 and 5 show RSS values as if they can only take whole number values, they each take a real number value in practice.

Each of the access points transmits a radio signal with its own access point ID as the header. Accordingly, in reference to radio signals received through the antenna 218 shown in FIG. 2, the recording program shown in FIG. 3 can identify from which access point the radio signal of a measured radio signal strength is transmitted. Since multiple access points are provided for the system as shown in FIG. 1, radio strength values from the respective access points can be regarded as vector values if arranged in a row. In this embodiment, RSS is used for showing radio signal strengths, and hence, such vector values are hereinafter referred to as RSS vectors in some cases. In order to minimize interference of radio signals, access points located close to each other in FIG. 1 may be set to use radio signals using different channels.

Next, a description will be given for a process for carrying out location label estimation by means of the method of the present invention. For carrying out this process, a large number of datasets as those shown in FIGS. 4 and 5 are required. The larger the number of datasets, the more accurately the location can be measured, and the longer it takes for completing the process. Hence, a preferable number of datasets is several thousand in total, and this is the number generally chosen to use. In this embodiment, 5000 datasets are prepared in total, although the number of datasets is not limited thereto.

According to the above descriptions given in reference to FIGS. 3 to 5, datasets are divided into the following four categories:

1. data with a trace ID and a location label;
2. data without any trace ID, but with a location label;
3. data with a trace ID, but without any location label; and
4. data without any trace ID and location label.

Hereinafter, the above data categories are respectively referred to as types 1, 2, 3 and 4. Since the label propagation method that is a prerequisite for the method of the invention is based on semi-supervised learning, learning datasets need to be prepared in advance. At least some learning datasets to be prepared need to be datasets each having a location label, that is, datasets of either the above type 1 or type 2. The method of the invention is applicable to the case of using only learning data sets of type 2, but, if the learning datasets of type 1 are available, the method of the invention can achieve higher accuracy in location label estimation by using information on time proximity.

While expected to be datasets of either type 1 or type 2 in principle, the learning datasets may also contain datasets of either type 3 or type 4. Datasets of type 3 and type 4 may not at first seem to contribute to a location label estimation process because such data do not contain location label information. However, the datasets of type 3 and type 4 play a part in label propagation, and are thus not totally meaningless.

In this embodiment, learning data is created by the mobile computer PC shown in FIG. 1. The trace 104 through which the operator moves with the mobile computer PC to create learning datasets is shown in FIG. 1.

By contrast, datasets for which the values of the location labels are to be estimated are recorded by using an information terminal attached to, for example, a shopping basket of a supermarket. Specifically, when a customer places the shopping basket on a shopping cart, the information terminal starts to record the strengths of radio signals received from the multiple access points $AP_1$, $AP_2$ ... $AP_n$. At this point, the receiving sensitivity of the information terminal is set to be approximately equal to that of the mobile computer PC of FIG. 1.

The information terminal is set to record the strengths of received radio signals in a predetermined cycle. Here, datasets recorded by the information terminal do not contain any location label information, because it is unlikely that customers walk around for shopping while performing operations for recording location labels by using the information terminal. In this embodiment, however, datasets recorded by the information terminal each contain a trace ID and a time ID. When the customer places the shopping basket on the shopping cart, a value is set as the trace ID. Then, the value of the time ID is incremented every time of cyclic automatic data recording. When the customer pays for the items to buy at a cashier, the recording terminates. Datasets recorded in the above manner each contain a trace ID and a time ID without containing any location label as the datasets shown in FIG. 4 with data ID x_102 and x_103.

As described above, a dataset of type 3 is suitable as a dataset for which a location label value is to be estimated. However, it should be understood that, since a dataset for which a location label value is to be estimated does not necessarily contain a trace ID, the method of the invention can be effectively used for the case where the dataset is of type 4.

Next, the embodiment of the present invention will be described with respect to algorithms. As described above, the 5000 datasets are assumed to be used in total in this embodiment. The 5000 datasets include both learning datasets, and test datasets for each of which a location label value is to be estimated.

Each of the datasets is assumed to be expressed as $(X^{(i)}, y^{(i)})$, where $i=1 \ldots 5000$. Here, $X^{(i)}$ is the above-mentioned RSS vector, and $X^{(i)} \in R^n$ when n is assumed to denote the number of access points. In other words, $X^{(i)}$ is an n-dimensional vector having real number components. Here, R=[−100,0] as described previously.

In addition, the location label $y^{(i)}$ satisfies $y^{(i)} \in \{1 \ldots 120\}$. In the initial stage, however, a large number of datasets having no specific location label are included in the datasets, and the value of $y^{(i)}$ is unspecified in such datasets.

Moreover, although the representation of $(X^{(i)}, y^{(i)})$ does not include any information on trace ID, the dataset also contains information on a trace ID and time ID in practice.

Assume that each of L datasets respectively having specified location labels is expressed as $(X^{(i)}, y^{(i)})$, where $i=1 \ldots L$.

Then, an object of the process of this embodiment is to predict the location labels of the unlabeled data $y^{(L+1)}, \ldots, y^{(N)}$ by using the learning datasets with definite location labels.

Although the value of the above number L is preferably large, it was found that desired results can be obtained under the condition that even approximately 10% of the number of all the datasets, i.e., approximately 500 datasets in this case, are the datasets with definite location labels.

Here, a plausibility score function $f^{(i)}(c)$ is used. This function $f^{(i)}(c)$ shows the plausibility that the i-th dataset has a label c. This can be defined as $f^{(i)}(c) \in [0,1]$.

In the case of FIG. 1, $c \in \{1 \ldots 120\}$.

For the labeled datasets $i=1 \ldots L$, the following holds $$f^{(i)}(c) = \begin{cases} 1 & (\text{if } c = y^{(i)}) \\ 0 & (\text{otherwise}) \end{cases}. \qquad \text{[Expression 1]}$$

For the unlabeled datasets $i=L+1 \ldots N$, the initial values of the plausibility score function $f^{(i)}(c)$ are set to be any value, e.g. 0.

Accordingly, the object of this process is expressed as follows by using a formula. The process is to predict $f^{(i)}(y^{(i)})$ for $\forall c$ and $i \geq L+1$.

When the predicted values of $f^{(i)}(y^{(i)})$ are obtained in the above condition, the most-probable label for the i-th data, where $i \geq L+1$, can be obtained. In other words, the location label c which leads to the largest plausibility score is considered to be most likely the location label of the i-th dataset.

$$\hat{e}^{(i)} = \underset{c}{\arg\max} f^{(i)}(c) \qquad \text{[Expression 2]}$$

In this label propagation framework, an attempt is made to minimize the discrepancies of plausibility scores among neighborhood instances, that is, neighborhood datasets. This is an example of an optimization problem. The discrepancy of plausibility scores among neighborhood datasets is defined as $$\sum_{(i,j)} W^{(i,j)} \sum_c (f^{(i)}(c) - f^{(j)}(c))^2, \qquad \text{[Expression 3]}$$

In this expression, $W^{(i,j)}$ is a coefficient called affinity (also called similarity or proximity), and indicates the similarity between the i-th instance and the j-th instance. The specific definition of affinity in this embodiment of the invention will be described later.

The optimization problem for the discrepancies of the plausibility scores among the above neighborhood datasets has the following solution for $\forall c$ and $i \geq L+1$. Accordingly, instead of directly solving the above optimization problem, the predicted values can be obtained by iteratively calculating the following expression until the predicted values converge to a predetermined level.

$$f^{(i)}(c) = \frac{\sum_j W^{(i,j)} f^{(j)}(c)}{\sum_j W^{(i,j)}} \qquad \text{[Expression 4]}$$

In the preferred embodiment of the invention, the affinity is defined as follows.

$$W^{(i,j)} = \max\{W_X^{(i,j)}, W_t^{(i,j)}\} \quad \text{[Expression 5]}$$

For simplicity of description, $W_X^{(i,j)}$ and $W_t^{(i,j)}$ of Expression 5 are respectively called spatial affinity or spatial similarity, and temporal affinity or temporal similarity.

The spatial affinity is affinity between two RSS vectors $X^{(i)}$ and $X^{(j)}$, and is defined in the preferred embodiment of the invention as $$W_X^{(i,j)} = \exp(-\|X^{(i)} - X^{(j)}\|_q^q). \quad \text{[Expression 6]}$$

where $\|\ldots\|_q$ represents the so-called q-norm. To be more precise, $\|\ldots\|_q$ is an expression $$\|X\|_q = \left(\sum_{d=1}^n \frac{|X_d|^q}{\sigma_d}\right)^{\frac{1}{q}}, \quad \text{[Expression 7]}$$

where n is the number of access points. In Expression 7, $\sigma_d$ is a scale parameter where $0<\sigma_d<\infty$. In this embodiment, in particular, $\sigma_d$ is set to satisfy $0.5<\sigma_d<1$. By using $\sigma_d$ as the scale parameter, a different value of $\sigma_d$ can be chosen for each $d=1\ldots n$. This indicates that the contribution of radio signals from a particular access point that tends to often transmit a noise value can be reduced by setting a small number for the value of $\sigma_d$. In general, however, the value of $\sigma_d$ may be set as $\sigma_1=\sigma_2=\ldots=\sigma_n$.

Here, the norm is called Euclidian distance when $q=2$, while the norm is called Manhattan distance when $q=1$. As can be understood from the fact that certain names are given to the above norms, it had been a common practice to use a norm that satisfies $q\geq 1$ in order to solve the optimization problem, and exceptions had not been considered. However, the present inventors dared to defy the common practice by using the norm that satisfies $0<q<1$. As a result, a significant improvement in the accuracy in location estimation was achieved by the location estimation method using the label propagation method.

In an example, in particular, the norm is set as $q=0.5$. Here, the norm is referred to as a norm less than 1 because the norm is set $0<q<1$. The following provides a possible reason for the success of the accuracy improvement by using the norm less than 1. An indoor radio environment, especially, is subject to large influences of, for example, radio signal reflections and interferences due to the surfaces of the walls. Because of this, radio signals from a certain access point suddenly becomes absent in some cases. An example of such a case in the example of FIG. 4 is that, in the dataset with the data ID x_103, the radio signal strength from the access point AP1, shown as AID1, suddenly drops from −65 to −100. Radio signal interference that occurs indoors is so complicated that it is difficult to clearly identify the cause. Setting this aside, it was found that the use of a norm less than 1 provided the effect of successfully reducing the influence, on calculation of label propagation, caused by such a lack of radio signal strength.

With further investigation, it was found that a q value closer to 0 is desired as more access points are used.

In addition, it was also found that a function as Expression 8, which is a so-called exponential attenuation function, is also effective in calculating spatial affinity.

$$W_X^{(i,j)} = \prod_{d=1}^n \left[1 + \frac{1}{\nu}\left(\frac{X_d^{(i)} - X_d^{(j)}}{\sigma_d}\right)^2\right]^{-\frac{(\nu+1)}{2}}, \quad \text{[Expression 8]}$$

where $\nu$ is a real number larger than 1, and is preferably a value of approximately 3.0 or 4.0, while n is the number of access points. A value is set for $\sigma_d$ in the same manner as in the case of Expression 7.

Alternatively, another exponential attenuation function shown below can be used for calculating spatial affinity.

$$W_X^{(i,j)} = \prod_{d=1}^n \left[1 + \frac{1}{\beta}\left|\frac{X_d^{(i)} - X_d^{(j)}}{\sigma_d}\right|\right]^{-\beta}, \quad \text{[Expression 9]}$$

where $\beta$ is a real number larger than 1, and is preferably a value of approximately 3.0 or 4.0, while n is the number of access points. A value is set for $\sigma_d$ in the same manner as in the case of Expression 7.

It may be said that the norm less than 1 and the exponential attenuation function are alike in terms of the asymptotic nature. Use of such an asymptotic similarity function makes a noise value of radio signal strength from a certain access point less noisy, and thereby reduces the influence of such noise value on the calculation of the similarity. In this sense, the exponential attenuation function decays faster with distance than the norm less than 1. Moreover, if the values $\nu$ or $\beta$ is set as $\infty$ in Expression 8 or Expression 9, the calculation is more similar to the calculation using the 2-norm.

Next, the temporal affinity given in this embodiment is shown below.

$$W_t^{(i,j)} = p \cdot \delta(TID^{(i)} = TID^{(j)}) \cdot \delta(|t^{(i)} - t^{(j)}| = 1) \quad \text{[Expression 10]}$$

Expression 10 is a function obtained by extending the Kronecker δ. The function δ returns 1 if the equations in parentheses of the function are satisfied, and 0 if otherwise. Hence, this temporal affinity takes a value of p, in the case where the dataset i and the dataset j have the same trace ID but different time IDs having a difference of 1. In other cases, the temporal affinity takes the value of 0. An example of returning the value p is the case of having a relationship between the datasets of the data ID x_101 and the data ID x_102 of FIG. 4. This indicates that temporal affinity is considered to be large when datasets have the same trace ID while having time IDs proximate to each other. In other words, the above indicates that the datasets just proximate to each other in terms of time and may have the same location label with high probability.

In this embodiment of the invention, $p=1$ is used. In addition, the spatial affinity $W_X^{(i,j)}$ can never be larger than 1 as can be seen from Expression 6. Accordingly, in this case, the temporal affinity is eventually set as the affinity $W^{(i,j)}$ by using Expression 5, when the datasets i and j have the same temporal-sequence ID but different time IDs with a difference of 1.

However, p may be set to be a positive number smaller than 1. In this case, instead of the temporal affinity, the spatial affinity may be set as the affinity $W^{(i,j)}$ if the spatial affinity takes a value extremely close to 1 even though the datasets i and j have the same trace ID but different time IDs with a difference of 1.

Expression 10 for obtaining temporal affinity takes into account only the case where time IDs are proximate to each other. Hence, instead of Expression 10, Expression 11 can be used for obtaining temporal affinity, for example. Expression 11 does not return 0 for the temporal affinity even when the difference between time IDs is 2 or larger.

$$W_t^{(i,j)} = p \cdot \delta(TID^{(i)} = TID^{(j)}) \cdot \exp(-\|t^{(i)} - t^{(j)}\|_r^r), \quad \text{[Expression 11]}$$

where $$\|X\|_r = \left(\frac{|X|^r}{\sigma}\right)^{\frac{1}{r}}, \quad \text{[Expression 12]}$$

and where $0<\sigma<\infty$, preferably $0.5<\sigma<1$, and also preferably $0<r\leqq2$. The reason why r can take a value that is 1 or larger ($r\geqq1$) is because asymptotic smoothness does not need to be taken into account for the temporal affinity as much as for the spatial affinity. In consideration of the asymptotic smoothness, an exponential attenuation function may also be used for obtaining the temporal affinity. However, this would not provide as many benefits as in the case of using the exponential attenuation function for obtaining the spatial affinity.

In calculating the temporal affinity, a trace ID may not be included in one of, or both of, the datasets i and j in some cases, if the datasets i and j are of type 2 or type 4 described above. In these cases, 0 is simply returned as the temporal affinity without any calculation of Expression 10 and Expression 11.

In addition, from the above embodiment, it is found that a location can be estimated with a certain level of accuracy by using only the spatial affinity without taking into account the temporal affinity (that is, by using only $W_X^{(i,j)}$ for the right-hand side of Expression 5). However, by choosing the one having a larger value from the spatial affinity and temporal affinity, estimation accuracy was significantly improved.

Hereinbelow, a process of this embodiment will be described with reference to the flowchart shown in FIG. 6. In Step 602 of FIG. 6, for the purpose of carrying out the process, the values of measured radio signals as well as the corresponding location label values and trace IDs are stored on the HDD 208 shown in FIG. 2. The stored datasets include both learning datasets and test datasets.

Preferably, the learning datasets are recorded by using the mobile computer PC, while test datasets are obtained by means of another information terminal or the like, and then is imported to the HDD 208 of the mobile computer PC through an unillustrated USB interface or the like.

Figure 6:
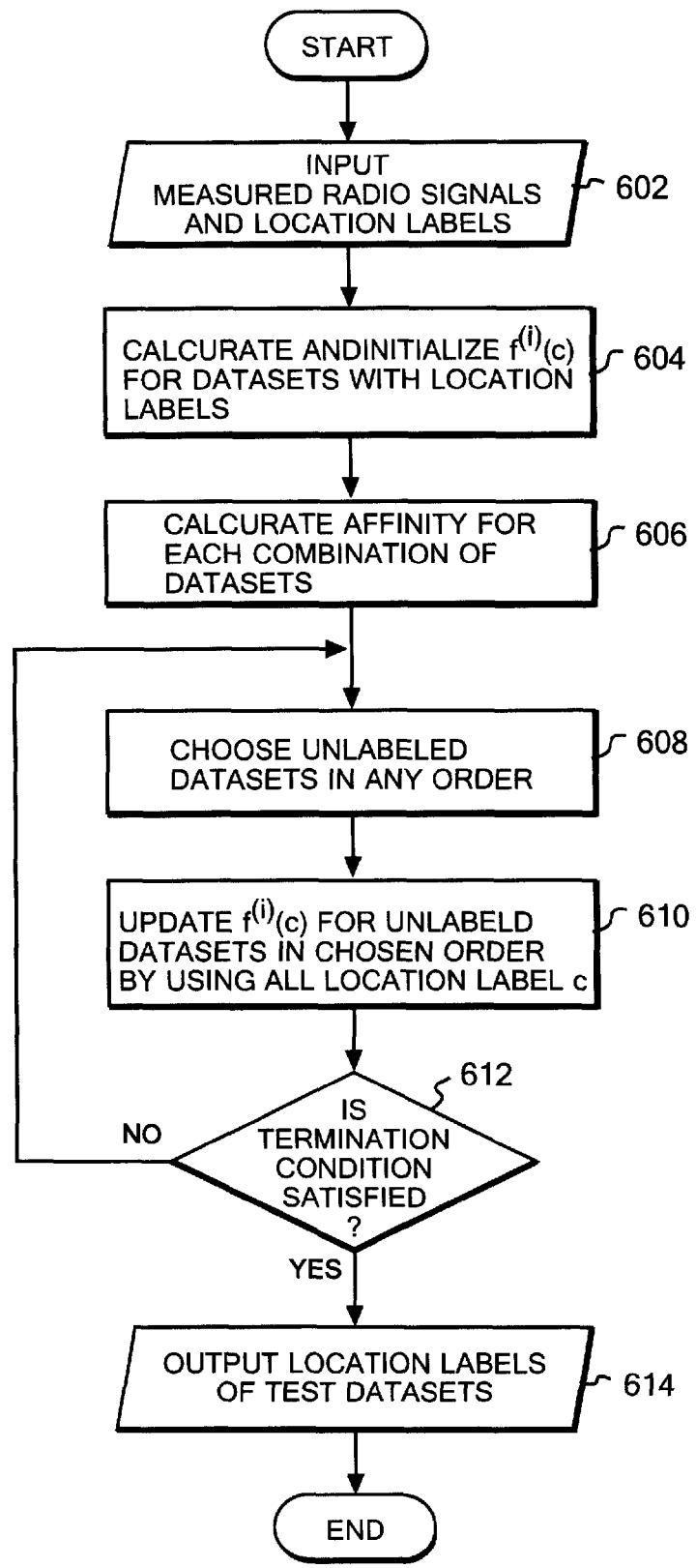
FIG. 6 is a flowchart of a location label estimation process.

A program for implementing the process illustrated by the flowchart of FIG. 6 is stored on the HDD 208 in advance, and can be started in response to a certain operation using the mouse 212 or the keyboard 210. This program can be written in an existing programming language, such as C, C++ or JAVA®, or can also be conveniently implemented by using the functionality of a statistical language, such as the R language.

In Step 604, the function $f^{(i)}(c)$ is initialized for the datasets with location labels in accordance with Expression 1. The function $f^{(i)}(c)$ is initialized to have 0 for all the datasets with no location labels.

In Step 606, the affinity $W^{(i,j)}$ is calculated for each of all the (i,j) combinations (i,j=1 . . . N) by using Expressions 5, 6, 7 and 10. The calculated affinities $W^{(i,j)}$ are temporally stored on the HDD 208 for later use. Here, Expressions 8 and 9 may be used instead of Expressions 6 and 7 for calculating the spatial affinity, and Expression 11 or 12 may be used instead of Expression 10 for calculating the temporal affinity. After both the spatial affinity and the temporal affinity are obtained, the affinity having the larger value is chosen as the eventual affinity in accordance with Equation 5.

In step 608, unlabeled datasets are chosen in any order, for example, in ascending order of i=L+1 . . . N.

In Step 610, the predicted values of $f^{(i)}(c)$ from Expression 4 are updated for all the location labels c by using one by one the unlabeled datasets sequentially chosen in Step 608.

In Step 612, whether the termination condition is satisfied or not is judged. Here, an example of the termination condition is that the number of iterative executions of Steps 608 and 610 exceeds a predetermined number. For example, the termination condition is determined to be satisfied when the above steps have iteratively executed three times as many as the number of all the datasets. Another example of the termination condition is that the absolute value of the difference between $f^{(i)}(c)$ calculated in last place and $f^{(i)}(c)$ calculated in second to last place is smaller than a predetermined value.

For implementation, it is easier to set a number for iterative executions of the steps than to detect that the difference between the values obtained from the last and second to last calculations becomes smaller than a predetermined value.

If it is judged that the termination condition is satisfied in Step 612, the predicted values of $f^{(i)}(c)$ are determined for all the location labels c and the datasets i=L+1 . . . N. As a result, the location label c having the highest plausibility score is determined for each of the datasets i. Then, the determined location label for each test dataset is written to the HDD 208, and is to be used in a trace analysis and the like to be carried out later.

In the above-described embodiment, the combination of multiple WiFi access points and a mobile computer that has a wireless LAN interface capable of receiving radio signals from the access points is used for recording radio signal strength datasets. However, the configuration for recording employed in the application of the invention is not limited to the above. Instead, the recording may be carried out, for example, by attaching a radio frequency identification (RFID) active tag to a mobile object targeted for location estimation, and then by receiving a radio signal generated from the active tag at access points. In this case, the strengths of radio signals can be recorded by computers connected to the access points instead of the RFID active tag.

Hereinbelow, the procedures for location estimation will be described in detail.

Firstly, an area inside the store is divided in accordance with the purpose of the analysis, and then location labels are provided respectively to the resultant sub-areas (see FIG. 1).

Either before or after the above-mentioned area division, multiple radio signal sources (wireless LAN access points or RFID antennas) are installed in the store. All the radio signal sources are connected to a central server through a network. In the case of using an active tag, the RFID antennas serve as receivers.

Here, all the access points are respectively provided with access point IDs so that the access points can be individually identified.

Then, a person in charge of the layout of the store walks around, in the store, with a radio signal receiver (or a radio signal source in the case of using the active tag) (see the trace 104 shown in FIG. 1, for example). The radio signal receiver is, for example, a laptop computer or a PDA with a wireless LAN card and an antenna. The radio signal receiver measures, and then records the strengths of radio signals from all the access points. It is desirable that radio signal strengths be each recorded together with a trace ID and a time ID as shown in FIG. 4, but the radio signal strengths may also be recorded without any trace ID or time ID. The recorded data are preferably stored on a local disk of the radio signal receiver, but may also be transmitted to the server through the network and then stored in a storage of the server.

In the data recording, a label indicating the current location is stored in association with the datasets on radio signal strengths received at the location. To achieve location estimation with high accuracy, each location needs to have at least one radio signal dataset measured and recorded with the corresponding location label. FIG. 3 shows an example of the graphic user interface used for recording the measured radio signal datasets with the location labels. As shown in FIG. 3, a location label is manually inputted by the user at each of the locations. Consequently, the radio signal datasets with the location labels are measured for all the locations. In this manner, the learning datasets are recorded.

Thereafter, a tester (customer) walks around in the store with the radio signal receiver to record measured radio signal datasets in the same way as above. In practice, the radio signal receiver may be attached to a shopping basket or a shopping cart. Here, the measured radio signal datasets do not contain any label in principle, because the customer should concentrate on shopping without thinking about the location labels at all. Meanwhile, time-series information needs to be included, because the location estimation in its nature is required to determine the trace taken by the customer.

Both the learning datasets and the test datasets, which were recorded while the customer was walking around in the store, are collectively recorded on the HDD of a given computer. The computer may be either the laptop computer with which the person in charge of the layout of the store walked around in the store, or another higher-end computer.

Then, through the above-described process of the present invention using the label propagation algorithm, the most-probable location label is estimated for each of the unlabeled measured radio signal datasets recorded while the customer moves around. Then, the data on the trace taken by the customer is obtained by combining the estimated locations and the time-series information.

The learning data can be used also to obtain trace data of other customers.

After that, the trace data thus obtained from multiple customers and relevant other data (such as the point of sale (POS) data of purchased items) are analyzed to identify a relationship therebetween, and then marketing strategies for increasing sales in store are created and implemented based on the analysis results.

In addition, after the implementation of the marketing strategies, trace data are further measured for customers to evaluate the effectiveness of the strategies. It should be noted that although learning data can be used many times in principle, the data is preferably to be updated as needed since the radio signal status varies depending on the temperature, humidity, layout of partitions and the like.

Hereinabove, the case of applying the present invention to the label propagation method has been described. However, the application of the invention is not limited to the above-described case, and the invention can be widely used for techniques for estimating an unknown location label from known labels on the basis of the similarities indicating the neighborhood relationships.

In addition, although the example of using the invention for a trace analysis has been described in the above embodiment, the invention can also be used for mobile commerce, for a mobile robot to determine action based on self location estimation, for healthcare for elderly or handicapped people, or for the like. For example, in the application of a mobile robot determining an action based on self location estimation, the robot can obtain the data on its surrounding environment most of which have location labels, and thus can estimate an unknown location label only on the basis of the similarities indicating the neighborhood relationships without label propagation. A more general estimation process like this is also within the scope of the present invention, and the use of the similarity based on the norm less than 1 or the exponential attenuation function is effective in such a case.

Hereinabove, the present invention has been described on the basis of the particular embodiment. However, the invention is not limited to the particular embodiment, and is applicable to various application examples without deviating from the spirit of the present invention.

This invention is advantageous in that, even in an indoor noisy radio environment having converging and reflected radio signals, a location is estimated with higher accuracy by calculating a location estimation value based on asymptotic similarities, than by using a conventional location estimation method with triangulation.

Although the preferred embodiment of the present invention has been described in detail, it should be understood that various changes, substitutions and alternations can be made therein without departing from the spirit and scope of the inventions as defined by the appended claims.

What is claimed is:

1. A system for estimating a location label of a vector dataset without any location label from a plurality of vector datasets respectively with location labels using a computer, the system comprising:
    storage means provided in the computer;
    means for storing the vector datasets in the storage means of the computer;
    means for calculating the similarity between the vector dataset without any location label and each neighboring vector dataset with a location label, by using any one of a q-norm wherein $0<q<1$ and an exponential attenuation function; and
    means for estimating the location label of the vector data without any location label from the calculated similarities,
    wherein the similarities are calculated by means of the following expression using the q-norm, $$W_X^{(i,j)} = \exp(-\|X^{(i)} - X^{(j)}\|_q^q),$$

where $X^{(i)}$ and $X^{(j)}$ denote i-th and j-th vectors, respectively, and $$\|X\|_q = \left( \sum_{d=1}^{n} \frac{|X_d|^q}{\sigma_d} \right)^{\frac{1}{q}}$$

where n denotes the number of dimensions of the vector and $0<\sigma_d<\infty$.

2. A location estimation method for estimating a location from radio signal strength datasets by means of a computer, the method comprising the steps of:
    preparing a plurality of radio signal strength vector datasets with location labels and a plurality of radio signal strength vector datasets without location labels, respectively, and then storing the prepared datasets in storage means of the computer;
    setting, by means of the computer, an initial value of the plausibility score $f^{(i)}(c)$ wherein $i=1\ldots N$ and wherein N denotes the number of all the prepared radio signal strength vector datasets such that each of the radio signal strength vector datasets with location labels and the radio signal strength vector datasets without location labels has a location label c;

calculating, using the computer, the similarity $W^{(i,j)}$ for each combination of i and j wherein i,j=1 . . . N, by using any one of a q-norm wherein 0<q<1, of the radio signal strength vector and an exponential attenuation function;

calculating, by means of the computer, $f^{(i)}(c)$ for each of the radio signal strength vector datasets without location labels, by using the following expression $$f^{(i)}(c) = \frac{\sum_j W^{(i,j)} f^{(j)}(c)}{\sum_j W^{(i,j)}}; \text{ and}$$

iteratively executing the step of calculating $f^{(i)}(c)$ by means of the computer.

3. The method according to claim 2, wherein the step of calculating the similarity $W^{(i,j)}$ includes the steps of:
calculating the temporal similarity $W_t^{(i,j)}$; and
choosing, as the similarity $W^{(i,j)}$, one having the larger value from the temporal similarity $W_t^{(i,j)}$ and the spatial similarity calculated by using any one of the q-norm and the exponential attenuation function.

4. The method according to claim 3, wherein the temporal similarity $W_t^{(i,j)}$ is calculated by using the following expression, $$W_t^{(i,j)} = p \cdot \delta(TID^{(i)} = TID^{(j)}) \cdot \delta(|t^{(i)} - t^{(j)}| = 1)$$

where $0 < p \leq 1$ is a constant parameter, $TID^{(i)}$ is the trace ID to which the i-th vector belongs, and $t^{(i)}$ is the time of observation of the i-th vector.

5. The method according to claim 3, wherein the temporal similarity $W_t^{(i,j)}$ is calculated by using the following expression, $$W_t^{(i,j)} = p \cdot \delta(TID^{(i)} = TID^{(j)}) \cdot \exp(-\|t^{(i)} - t^{(j)}\|_r^r)$$

where $$\|X\|_r = \left(\frac{|X|^r}{\sigma}\right)^{\frac{1}{r}},$$

and where $0 < p \leq 1$, $0 < r \leq 2$, and $0 < \sigma < \infty$.

6. The method according to claim 2, wherein the spatial similarities are calculated using the following expression using the q-norm, $$W_X^{(i,j)} = \exp(-\|X^{(i)} - X^{(j)}\|_q^q)$$

where $X^{(i)}$ denotes the i-th radio signal strength vector, and $$\|X\|_q = \left(\sum_{d=1}^n \frac{|X_d|^q}{\sigma_d}\right)^{\frac{1}{q}}$$

where n denotes the number of dimensions of the radio signal strength vector, and each of $0 < \sigma_d < \infty$ wherein d=1, . . . , n denotes a constant scale parameter.

7. The method according to claim 6, wherein both q and σ are set at 0.5.

8. The method according to claim 2, wherein the spatial similarities are calculated by using the following expression with an exponential attenuation function, $$W_X^{(i,j)} = \prod_{d=1}^n \left[1 + \frac{1}{v}\left(\frac{X_d^{(i)} - X_d^{(j)}}{\sigma_d}\right)^2\right]^{-\frac{(v+1)}{2}}$$

where $X^{(i)}$ and $X^{(j)}$ denote i-th and j-th vectors, respectively; n denotes the number of dimensions of the vector; $0 < \sigma_d < \infty$; and v is a number larger than 1.

9. The method according to claim 2, wherein the spatial similarities are calculated by using the following expression using exponential attenuation function, $$W_X^{(i,j)} = \prod_{d=1}^n \left[1 + \frac{1}{\beta}\left|\frac{X_d^{(i)} - X_d^{(j)}}{\sigma_d}\right|\right]^{-\beta}$$

where $X^{(i)}$ and $X^{(j)}$ denote i-th and j-th vectors, respectively; n denotes the number of dimensions of the vector; $0 < \sigma_d < \infty$; and β is a number larger than 1.

10. A program for estimating a location from radio signal strength datasets by means of a computer, the program causing the computer to execute the steps of:

preparing a plurality of radio signal strength vector datasets respectively with location labels and a plurality of radio signal strength vector datasets without location labels, and then storing the prepared datasets into storage means of the computer;

setting an initial value of the plausibility score $f^{(i)}(c)$ wherein i=1 . . . N and wherein N denotes the number of all the prepared radio signal strength vector datasets that each of the radio signal strength vector datasets with location labels and the radio signal strength vector datasets without location labels has a location label c;

calculating the similarity $W^{(i,j)}$ for each combination of i and j wherein i,j=1 . . . N, by using any one of a q-norm wherein 0<q<1, of the radio signal strength vector and an exponential attenuation function;

calculating $f^{(i)}(c)$ for each of the radio signal strength vector datasets without location labels, by using the following expression $$f^{(i)}(c) = \frac{\sum_j W^{(i,j)} f^{(j)}(c)}{\sum_j W^{(i,j)}}; \text{ and}$$

iteratively executing the step of calculating $f^{(i)}(c)$.

11. The program according to claim 10, wherein the step of calculating the similarity $W^{(i,j)}$ includes the steps of:
calculating temporal similarity $W_t^{(i,j)}$; and
choosing, as the similarity $W^{(i,j)}$, one having the larger value from the temporal similarity $W_t^{(i,j)}$ and the spatial similarity calculated by using any one of the q-norm and the exponential attenuation function.

12. The program according to claim 11, wherein the spatial similarity is calculated by using the following expression using exponential attenuation function $$W_X^{(i,j)} = \prod_{d=1}^{n} \left[1 + \frac{1}{v}\left(\frac{X_d^{(i)} - X_d^{(j)}}{\sigma_d}\right)^2\right]^{-\frac{(v+1)}{2}}$$

where $X^{(i)}$ and $X^{(j)}$ denote i-th and j-th vectors, respectively; n denotes the number of dimensions of the vector; $0<\sigma_d<\infty$; and v is a number larger than 1.

13. The program according to claim 11, wherein the spatial similarity is calculated by using the following expression with an exponential attenuation function, $$W_X^{(i,j)} = \prod_{d=1}^{n} \left[1 + \frac{1}{\beta}\left|\frac{X_d^{(i)} - X_d^{(j)}}{\sigma_d}\right|\right]^{-\beta}$$

where $X^{(i)}$ and $X^{(j)}$ denote i-th and j-th vectors, respectively; n denotes the number of dimensions of the vector; $0<\sigma_d<\infty$; and $\beta$ is a number larger than 1.

14. The program according to claim 11, wherein the temporal similarity $W_t^{(i,j)}$ is calculated by using the following expression, $$W_t^{(i,j)} = p \cdot \delta(TID^{(i)} = TID^{(j)}) \cdot \delta(|t^{(i)} - t^{(j)}| = 1)$$

where $0<q\leq 1$ is a constant parameter, $TID^{(i)}$ is the trace ID to which the i-th vector belongs, and $t^{(i)}$ is the time of observation of the i-th vector.

15. The program according to claim 11, wherein the temporal similarity $W_t^{(i,j)}$ is calculated by using the following expression, $$W_t^{(i,j)} = p \cdot \delta(TID^{(i)} = TID^{(j)}) \cdot \exp(-\|t^{(i)} - t^{(j)}\|_r)$$

Where, $$\|X\|_r = \left(\frac{|X|^r}{\sigma}\right)^{\frac{1}{r}},$$

and where $0<p\leq 1$, $0<r\leq 2$, and $0<\sigma<\infty$.

16. The program according to claim 10, wherein the q-norm is calculated by using the following expression, $$W_X^{(i,j)} = \exp(-\|X^{(i)} - X^{(j)}\|_q^q)$$

where $X^{(i)}$ denotes the i-th radio signal strength vector and $$\|X\|_q = \left(\sum_{d=1}^{n} \frac{|X_d|^q}{\sigma_d}\right)^{\frac{1}{q}}$$

where n denotes the number of dimensions of the radio signal strength vector, and each of $0<\sigma_d<\infty$ wherein d=1, ..., n denotes a constant scale parameter.

17. The program according to claim 16, wherein both q and $\sigma$ are set at 0.5.

18. A system for estimating a location from radio signal strength datasets by means of a computer, the system comprising:

storage means;

means for preparing a plurality of radio signal strength vector datasets respectively with location labels and a plurality of radio signal strength vector datasets without location labels, and then storing the prepared datasets into the storage means;

means for setting an initial value of the plausibility score $f^{(i)}(c)$ wherein i=1... N and wherein N denotes the number of all the prepared radio signal strength vector datasets that each of the radio signal strength vector datasets with location labels and the radio signal strength vector datasets without location labels has a location label c;

means for calculating the similarity $W^{(i,j)}$ for each combination of i and j wherein i,j=1... N by using any one of a q-norm wherein $0<q<1$ of the radio signal strength vector and an exponential attenuation function;

means for calculating $f^{(i)}(c)$ for each of the radio signal strength vector datasets without location labels, by using the following expression $$f^{(i)}(c) = \frac{\sum_j W^{(i,j)} f^{(j)}(c)}{\sum_j W^{(i,j)}}; \text{ and}$$

means for iteratively executing the step of calculating $f^{(i)}(c)$.

19. The system according to claim 18, wherein the means of calculating the similarity $W^{(i,j)}$ includes:

means for calculating the temporal similarity $W^{(i,j)}$; and means of choosing as the similarity $W^{(i,j)}$, one having the larger value from the temporal similarity $W_t^{(i,j)}$ and the spatial similarity calculated by using any one of the q-norm and the exponential attenuation function.

20. The system according to claim 19, wherein the spatial similarity is calculated by using the following expression with an exponential attenuation function, $$W_X^{(i,j)} = \prod_{d=1}^{n} \left[1 + \frac{1}{v}\left(\frac{X_d^{(i)} - X_d^{(j)}}{\sigma_d}\right)^2\right]^{-\frac{(v+1)}{2}}$$

where $X^{(i)}$ and $X^{(j)}$ denote i-th and j-th vectors, respectively; n denotes the number of dimensions of the vector; $0<\sigma_d<\infty$; and v is a number larger than 1.

21. The system according to claim 19, wherein the spatial similarity is calculated by using the following expression with an exponential attenuation function, $$W_X^{(i,j)} = \prod_{d=1}^{n} \left[1 + \frac{1}{\beta}\left|\frac{X_d^{(i)} - X_d^{(j)}}{\sigma_d}\right|\right]^{-\beta}$$

where $X^{(i)}$ and $X^{(j)}$ denote i-th and j-th vectors, respectively; n denotes the number of dimensions of the vector; $0<\sigma_d<\infty$; and $\beta$ is a number larger than 1.

22. The system according to claim 19, wherein the temporal similarity $W_t^{(i,j)}$ is calculated by using the following expression, $$W_t^{(i,j)} = p \cdot \delta(TID^{(i)} = TID^{(j)}) \cdot \delta(|t^{(i)} - t^{(j)}| = 1)$$

where $0 < p \leq 1$ is a constant parameter, $TID^{(i)}$ is the trace ID to which the i-th vector belongs, and $t^{(i)}$ is the time of observation of the i-th vector.

23. The system according to claim 19, wherein the temporal similarity $W_t^{(i,j)}$ is calculated by using the following expression, $$W_t^{(i,j)} = p \cdot \delta(TID^{(i)} = TID^{(j)}) \cdot \exp(-\|t^{(i)} - t^{(j)}\|_r^r)$$

where $$\|X\|_r = \left(\frac{|X|^r}{\sigma}\right)^{\frac{1}{r}},$$

and where $0 < p \leq 1$, $0 < r \leq 2$, and $0 < \sigma < \infty$.

24. The system according to claim 18, wherein the q-norm is calculated by using the following expression, $$W_X^{(i,j)} = \exp(-\|X^{(i)} - X^{(j)}\|_q^q)$$

where $X^{(i)}$ denotes the i-th radio signal strength vector and $$\|X\|_q = \left(\sum_{d=1}^n \frac{|X_d|^q}{\sigma_d}\right)^{\frac{1}{q}}$$

where n denotes the number of dimensions of the radio signal strength vector, and each of $0 < \sigma_d < \infty$ wherein $d = 1, \ldots, n$ denotes a constant scale parameter.

25. The system according to claim 24, wherein both q and σ are set at 0.5.

26. A system for estimating a location label of a vector dataset without any location label from a plurality of vector datasets respectively with location labels using a computer, the system comprising:
   storage means provided in the computer;
   means for storing the vector datasets in the storage means of the computer;
   means for calculating the similarity between the vector dataset without any location label and each neighboring vector dataset with a location label, by using any one of a q-norm wherein $0 < q < 1$ and an exponential attenuation function; and
   means for estimating the location label of the vector data without any location label from the calculated similarities,
   wherein the similarities are calculated by means of the following expression using an exponential attenuation function, $$W_X^{(i,j)} = \prod_{d=1}^n \left[1 + \frac{1}{v}\left(\frac{X_d^{(i)} - X_d^{(j)}}{\sigma_d}\right)^2\right]^{-\frac{(v+1)}{2}}$$

where n denotes the number of dimensions of the vector, $0 < \sigma_d < \infty$, and v is a number larger than 1.

27. A system for estimating a location label of a vector dataset without any location label from a plurality of vector datasets respectively with location labels using a computer, the system comprising:
   storage means provided in the computer;
   means for storing the vector datasets in the storage means of the computer;
   means for calculating the similarity between the vector dataset without any location label and each neighboring vector dataset with a location label, by using any one of a q-norm wherein $0 < q < 1$ and an exponential attenuation function; and
   means for estimating the location label of the vector data without any location label from the calculated similarities,
   wherein the similarities are calculated by means of the following expression using an exponential attenuation function, $$W_X^{(i,j)} = \prod_{d=1}^n \left[1 + \frac{1}{\beta}\left|\frac{X_d^{(i)} - X_d^{(j)}}{\sigma_d}\right|\right]^{-\beta}$$

where n denotes the number of dimensions of the vector, $0 < \sigma_d < \infty$, and β is a number larger than 1.

* * * * *